United States Patent
Jakubowski et al.

[15] 3,636,429
[45] Jan. 18, 1972

[54] LOGIC CIRCUITRY FOR PROVIDING STOPPING CONTROL FOR STEPPING MOTORS

[72] Inventors: Marek Jakubowski; Joseph P. Pawletko, both of Endwell, N.Y.

[73] Assignee: International Business Machines Corporation, Armonk, N.Y.

[22] Filed: May 8, 1970

[21] Appl. No.: 35,797

[52] U.S. Cl. ................................318/685, 318/696
[51] Int. Cl. .......................................G05b 19/40
[58] Field of Search .................318/138, 254, 696, 685

[56] References Cited

UNITED STATES PATENTS

| | | | |
|---|---|---|---|
| 3,374,410 | 3/1968 | Cronquist et al. | 318/685 |
| 3,414,786 | 12/1968 | Kasmer et al. | 318/685 X |
| 3,458,786 | 7/1969 | Thompson | 318/138 X |
| 3,463,985 | 8/1969 | Fredriksen | 318/685 |
| 3,476,996 | 11/1969 | Fredriksen | 318/696 |
| 3,482,155 | 12/1969 | Fredriksen | 318/685 |
| 3,523,230 | 8/1970 | York | 318/138 X |

Primary Examiner—G. R. Simmons
Attorney—Sughrue, Rothwell, Mion, Zinn & Macpeak

[57] ABSTRACT

The invention is concerned with circuitry for providing a sequence of stopping pulses derived from motor feedback pulses. It includes means for providing an initial stop pulse which reverses the phase of the motor to thereby develop a negative torque. Intermediate stopping pulses in the form of feedback pulses continue to apply the negative torque to the rotor. A final stopping pulse not derived from the feedback pulses is applied to bring the motor to its equilibrium position. In this manner, a stepping motor can be stopped with substantially no oscillations after a specified number of steps.

7 Claims, 9 Drawing Figures

INVENTORS.
MAREK JAKUBOWSKI
JOSEPH PAWLETKO

BY *Sughrue, Rothwell, Mion, Zinn & Macpeak*

ATTORNEYS.

STEPPING MOTOR DRIVE SEQUENCE LOGIC
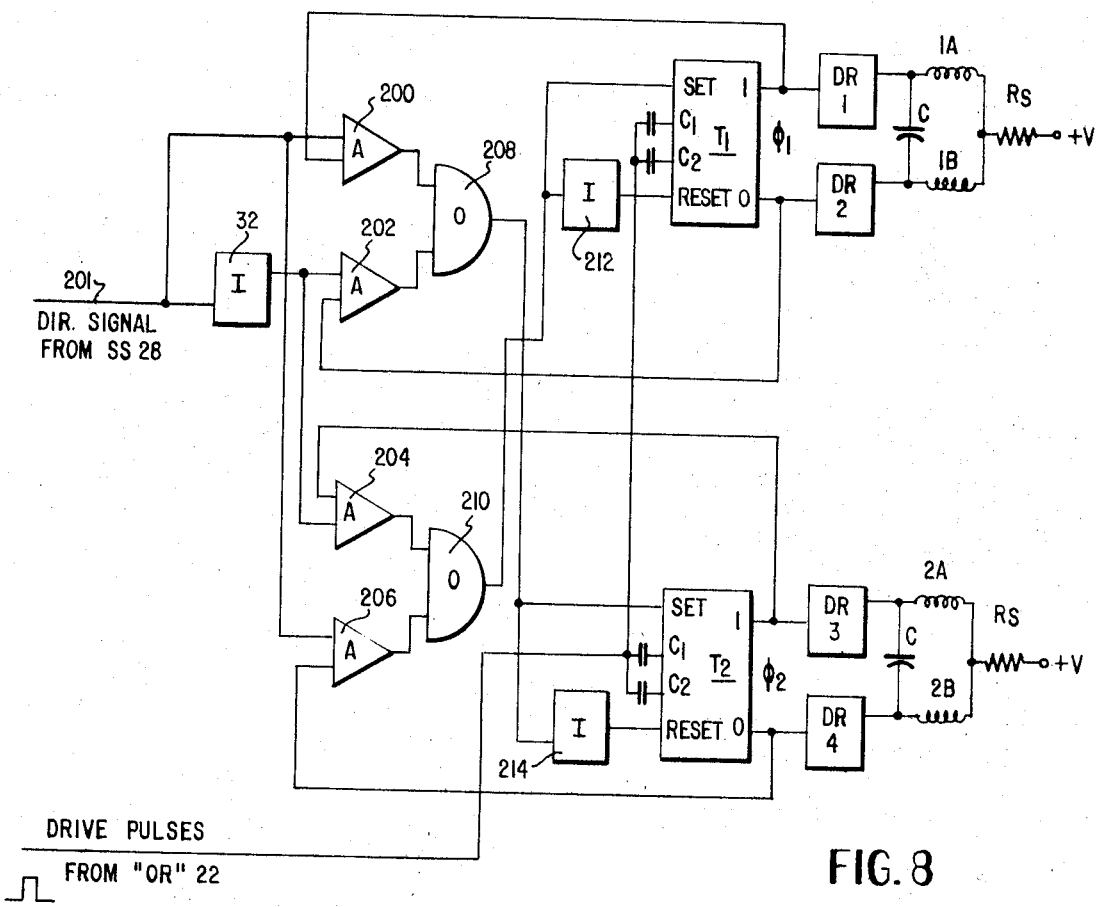
FIG. 8
FIG. 9
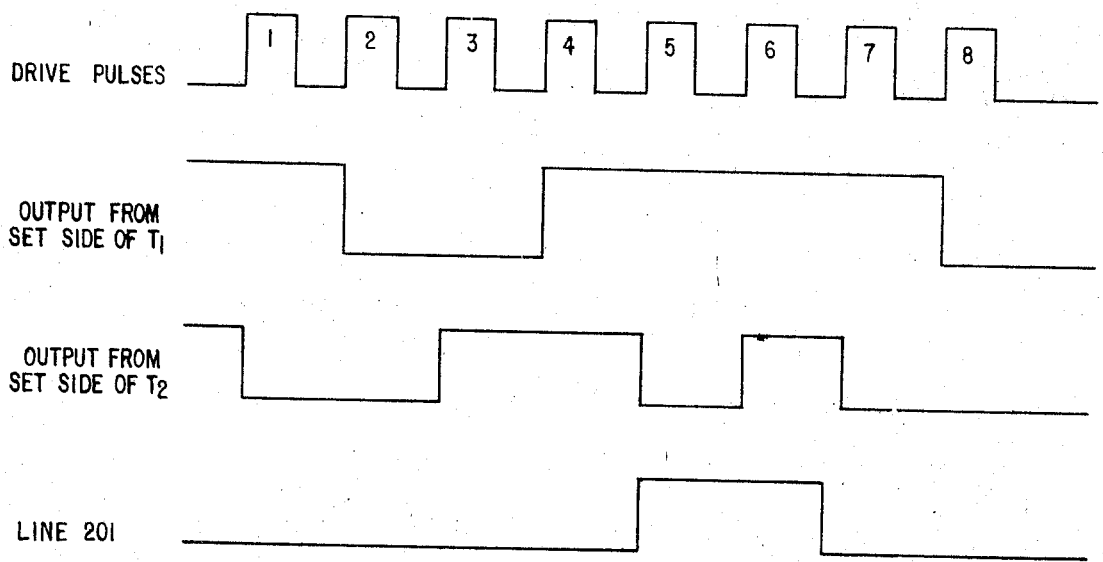

LOGIC CIRCUITRY FOR PROVIDING STOPPING CONTROL FOR STEPPING MOTORS

BACKGROUND OF THE INVENTION

1. Field of the Invention

The invention relates generally to stepping motors and specifically to a unique closed loop system for initiating the stopping sequence and for controlling this sequence until the motor stops.

2. Description of the Prior Art

Stepping motors have found wide application and acceptance in areas where material must be moved particular and precise distances. In operation, a number of pulses introduced into the driving circuit of a synchronous motor causes the rotor to rotate a predictable amount. Since the stepping motor must stop after a preselected number of steps, the motor must be equipped with stop control means which will effect a quick nonoscillatory stop after a designated step.

Previous systems for controlling the stopping of a stepping motor have included mechanical damping devices and open loop systems. The open loop system provides binary logic control means for controlling the stopping of the stepping motor. Such systems are sensitive to motor load variations and therefore can be tuned only to a specific load. If the load changes even slightly, the nonoscillatory stop is not realized and, in some cases, the motor may not stop at the required position.

SUMMARY OF THE INVENTION

The invention relates to a closed loop or feedback controlled stepping motor system which employs feedback pulses developed by a feedback transducer for controlling the stopping sequence of a stepping motor. By using such feedback pulses, the stopping sequence is virtually independent of the load, thus allowing for quick accurate stops under variable load conditions.

A stepping motor for use with this invention may be a salient pole, permanent magnet, two phase synchronous machine well known in the art. As an example, the motor may have four poles with the rotor 9 passing each pole in the sequence 1, 2, 3, and 4 as shown diagrammatically in FIG. 1. As is known in the art, the torque on the rotor acts in a direction to urge the field poles into alignment with the airgap flux. In operation, during the stepping sequence, drive pulses are applied to the motor's drivers through triggers as will be described below. The outputs of the triggers are switched in a manner to be described to effect sequential energization of the motor's phase windings. This has the effect of applying the field to the poles in succession. Since the field at each pole is so selected as to lead the rotor, the rotor attempts to "catch up" with the field, thereby developing a positive torque. By applying feedback pulses, corresponding to each of the rotor's step movements, to the drive windings of the motor, the motor will be stepped without the use of an additional pulse source. The motor's initial step is caused by the application of an external start pulse to the motor drive windings.

If, however, instead of switching the field to the next pole, it is in effect switched to the preceding pole, that is the pole which has been just passed by the rotor, the field now lags the rotor. If the field is again switched to each pole in the sequence described above, the field will continue to lag the rotor. Since the rotor will still attempt to align itself with the field, a negative torque is developed. The effect of the negative torque is to cause a slowing down of the motor.

Locating the rotor at any point in time can be easily accomplished by a variety of known means. For example, since each drive pulse causes the rotor to rotate a known angular distance, the position of the rotor can be determined simply by counting the number of drive pulses. Thus, to introduce the stopping sequence using the circuitry of this invention, all that is necessary is to locate the position of the rotor and apply the field to the pole which precedes the position of the rotor.

When the field at a pole is in line with the rotor no torque is produced and the motor is in its equilibrium condition. To insure that the motor will stop after a predetermined number of pulses, with substantially no oscillations, a final drive pulse, not derived from the feedback pulses is used. This pulse is so timed as to cause a drive pulse to switch the field to a pole which is in line with the rotor. In this manner, the rotor is aligned with the field thereby causing the development of a zero torque.

BRIEF DESCRIPTION OF THE DRAWINGS

FIG. 8 shows the logic circuitry which may be used to effect switching of the motor; and FIG. 9 is a timing diagram for the circuit of FIG. 8.

DETAILED DESCRIPTION OF THE PREFERRED EMBODIMENTS

Figure 1:
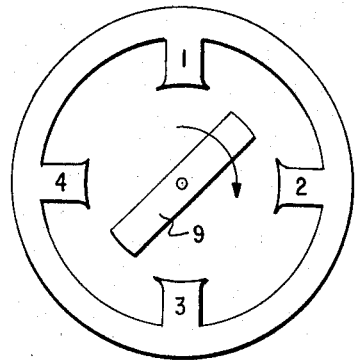
FIG. 1 is a highly simplified diagram of part of a two-phase synchronous motor which can be used with the stop circuitry of this invention.
Figure 2:
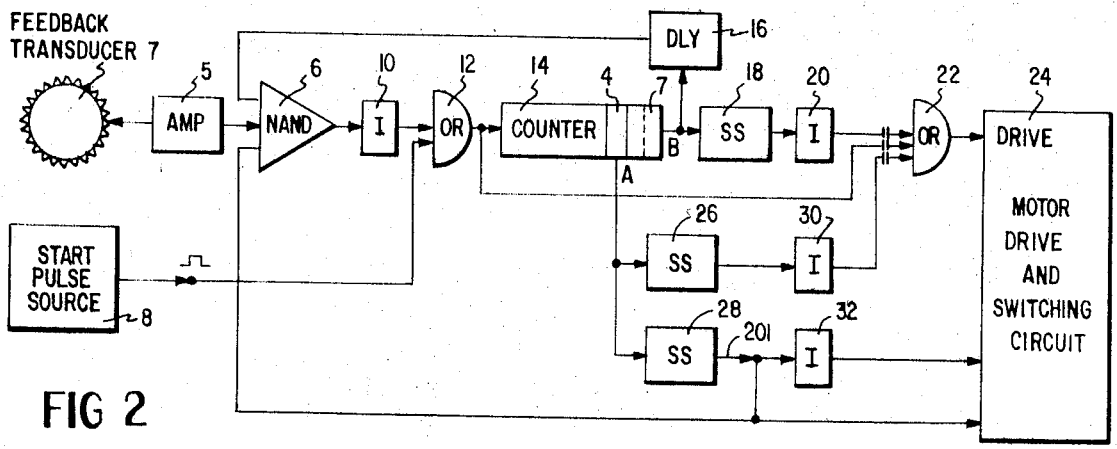
FIG. 2 shows the preferred embodiment of the logic circuitry used to carry out the teachings of this invention when applied to a single direction motor.

One embodiment of the invention is shown in FIG. 2. This embodiment applies the teaching of the invention to effect stoppage of a single direction stepping motor. Operation of the control circuitry of FIG. 2 will be described with reference to the timing diagram of FIG. 3.

Initially, a start pulse from source 8 is applied through OR-gate 12 to reset counter 14 from a nonzero state caused by a previous stepping sequence, while the delay circuit 16 delays the unblocking of NAND-gate 6. The output pulse from gate 12 is also applied to the AC-OR-gate 22 to deliver a drive pulse to a motor drive and switching circuit 24. AC-OR gates are known in the art and are responsive to either positive or negative pulses.

A drive and switching circuit 24, which may be used with this invention, is shown in detail in FIG. 8. A description of the operation of this circuit is included below. Briefly, the drive and switching circuit comprises four windings wound on the motor as described in the patent to L. J. Thompson, U.S. Pat. No. 3,328,658, issued June 27, 1967, and drivers under the control of logic circuitry for supplying pulses to the windings. Each drive pulse is selectively under the control of the logic circuitry, applied to the drivers to cause the motor to step one position for each pulse. As the motor is stepped one position, a feedback pulse is produced from feedback transducer 7. The feedback transducer is any optical, magnetic or capacitive transducer which picks up the rotor rotation and generates pulses corresponding to the rotor movement. Such devices are known in the art.

Each feedback pulse is applied through amplifier 5, gate 6, inverter 10, and gates 12 and 22 to produce additional drive pulses to drive the stepping motor. Additionally, the feedback pulses are presented through amplifier 5, gate 6, inverter 10, and gate 12 to binary counter 14.

Figure 3:
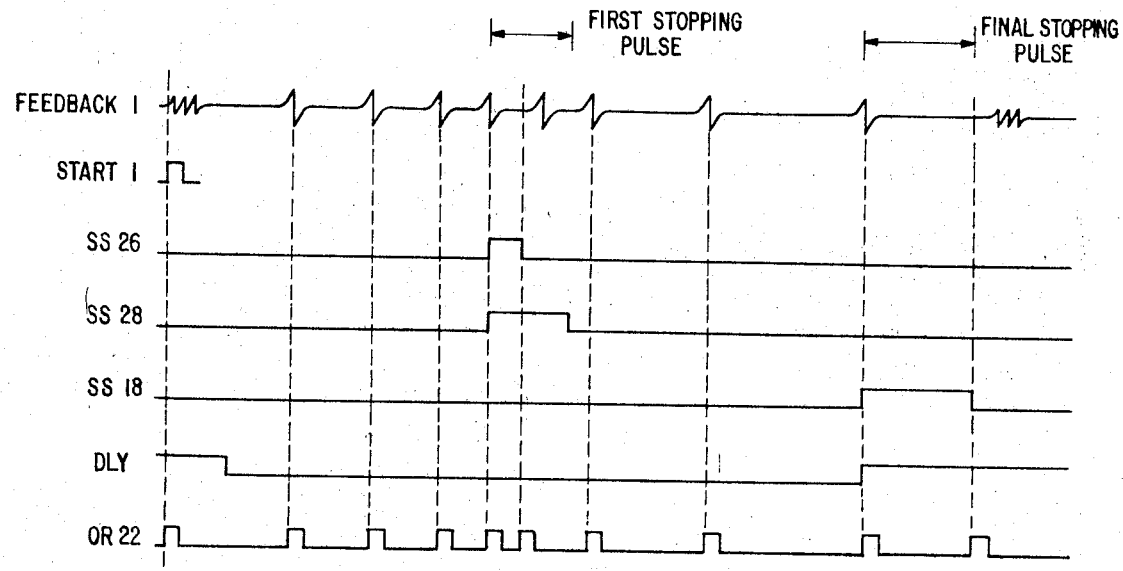
FIG. 3 is a timing diagram for the circuit shown in FIG. 2.

The circuit shown in FIG. 2 will be described in relation to an example where it is required to stop the motor after an eight step run with the motor being subjected to 10 drive pulses. The fourth feedback pulse, as shown in the timing diagram of FIG. 3, produces an output A from the counter 14 which triggers the single shots 26 and 28. The output of single shot 28 is fed to NAND-gate 6 and motor drive and switching circuit 24. The pulse width of the output of single shot 28 is so chosen as to block the NAND-gate for a period of time sufficient to block the next feedback pulse, the fifth in this example. This is shown in FIG. 3 where it is seen that there is no pulse from gate 22 in response to the fifth feedback pulse. In addition, the fifth pulse is not counted by the binary counter 14. The single shot 28 signal, being fed to the drive and switching circuit 24, has the effect of putting the circuit into its reverse mode. That is, the application of the pulse from single shot 26, while single shot 28 is on, causes the field to be in effect applied to the pole directly preceding the position of the rotor. In this way, the motor develops a negative torque.

To facilitate understanding of the operation of the invention in relation to the motor drive and switching circuit 24, operation of a typical drive and switching circuit will now be described. With reference to FIG. 8, switching is accomplished through the use of the logic circuitry comprising AND-gates 200 through 206, OR-gates 208 and 210 and inverters 212 and 214. This logic circuitry allows for the selective enabling of the set and reset terminals of flip-flops $T_1$ and $T_2$ which are switched by means of clock pulses to input terminals $C_1$ and $C_2$. Operation of these input terminals allows for the selective energization of drivers DR1–DR4 which in turn selectively applies drive pulses to the phase windings 1A, 1B, 2A and 2B of the motor. The flip-flops $T_1$ and $T_2$ and drivers DR1–DR4 and their operation are well known in the art. An example of the operation of the drivers and flip-flops are contained in the patent to Kozal et al., U.S. Pat. No. 3,443,191, issued May 6, 1969.

The drive pulses from OR-gate 22 in FIG. 2, switches $T_1$ and $T_2$ under the control of the logic circuitry. With the output from single shot 28, shown in FIGS. 2 and 8, normally low, as shown in FIG. 3, line 201 is low, thereby disabling AND-gates 200 and 206. However, due to the operation of inverter 32, AND-gates 202 and 204 are enabled. With the starting point of the analyses taken at that point when the output terminals of the set sides of flip-flop $T_1$ and $T_2$ are at a logic low and the output of gate 210 at a logic high, the logic low to the set input terminal and the high, due to inverter 214, to the reset input terminal of $T_2$ causes $T_2$ to change its state on the occurrence of a drive pulse labeled 1 in FIG. 9. These drive pulses correspond to the drive pulses from gate 22 shown in FIG. 3. On the other hand, since the output from gate 210 is at a logic high, the occurrence of a drive pulse will not cause $T_1$ to flip to its other state. The conditions of the flip-flops $T_1$ and $T_2$ are now such that the output terminal at the set side of $T_2$ is at a logic low while the output at the set side of $T_1$ remains high. This causes the output of OR-gate 208 to remain at a logic low while causing the output of gate 210 to also go low. Thus, on the next drive pulse, flip-flop $T_1$ is caused to switch to its opposite state while $T_2$ remains unswitched. If one would continue this analysis, it would be seen that the state of a flip-flop is changed every second drive pulse, as shown in FIG. 9. Under the conditions just described, it is also seen that flip-flop $T_1$ lags $T_2$ by one drive pulse, which results in a 90° phase relation between the outputs of both flip-flops. The lead or lag of $T_1$ is determined by the single shot 28 which determines the switching sequence.

To understand the reverse switching aspect of the logic circuitry of FIG. 8, let it be assumed that the single shot 28 is triggered by the fourth feedback pulse which corresponds to the fifth drive pulse. If single shot 28 was not triggered then, as explained previously, a sixth drive pulse would cause $T_1$ to switch while $T_2$ would remain unchanged. However, because single shot 28 has been triggered, line 201 is now at a logic high thereby enabling AND-gates 200 and 206 and disabling AND-gates 202 and 204. Since the fifth drive pulse has caused the output at the set side of $T_1$ to remain high and the output at the set side of $T_2$ to go to a logic low, OR-gates 208 and 210 are high. Thus, on the sixth drive pulse, $T_2$ is caused to switch while $T_1$ remains high. This was precisely the states of $T_1$ and $T_2$ after the occurrence of the fourth drive pulse.

When line 201 switches back to its logic low state, due to the timing out of the single shot 28 after the sixth drive pulse, the switching of $T_1$ and $T_2$ follows the pattern shown in FIG. 9. However, the sixth drive pulse has caused the field to lag the rotor thereby developing a negative torque.

Returning to the operation of the stopping logic, since the fifth feedback pulse is blocked, the motor drive is controlled by the output of single shot 26 which is fed through inverter 30 and OR-gate 22 to the motor drive and switching circuit 24. Single shot 26 is made adjustable so that it disintegrates before the end of the single shot 28 signal and further, is so adjusted that the rotor arrives at its stopping point after the eighth step with a zero velocity. The adjustment is made on a trial and error basis and varies from machine to machine. The pulse width of the output from single shot 28 is so chosen that it disintegrates before the next feedback pulse, the sixth in the instant case, thereby allowing the feedback pulses to once again control the motor drive. However, the introduction of the phase reversal by the signal from single shot 28 has caused the rotor to now lead the field which results in the negative torque. Application of this negative torque to the rotor causes it to begin to slow down. The slowing down of the rotor is represented in FIG. 3 by the increased spacing between the feedback pulses occurring after the fifth feedback pulse.

In the absence of further controls, the rotor's angular velocity would slowly approach zero. To increase the speed and sharpness of the stopping, that is, to substantially inhibit any oscillations around the stopping point, a last drive pulse attained from single shot 18 is used. On the occurrence of the eighth feedback pulse, the seventh counted, counter 14 produces an output at terminal B which triggers single shot 18 and through delay 16 blocks NAND-gate 6. In this way, the motor is no longer under the control of the feedback pulses. The trailing edge of the pulse from single shot 18 is so adjusted to occur at or at that point in time so that when the rotor arrives at the equilibrium position the field is switched and clamps the rotor. This pulse is applied through the inverter 20 and OR-gate 22 to produce the last drive pulse which has the effect of switching the motor into its equilibrium position. As shown in FIG. 3, the motor has attained equilibrium after the tenth drive pulse.

Figure 4:
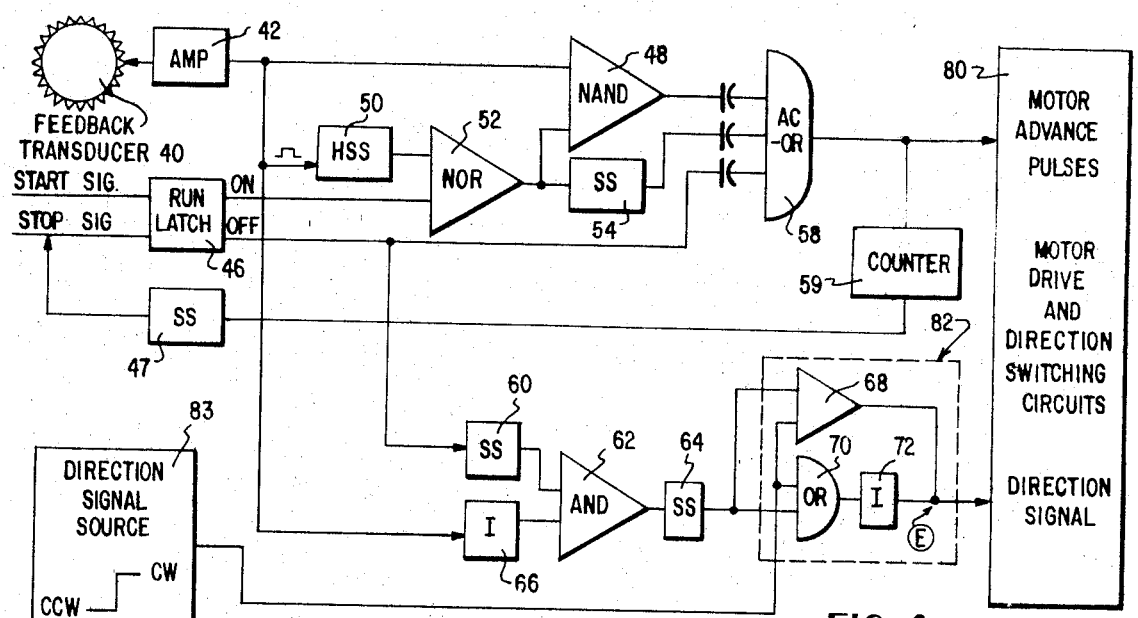
FIG. 4 shows the preferred embodiment of the logic circuit for accomplishing the teachings of this invention when applied to a bidirectional motor.

A second embodiment of the invention which may be used with a bidirectional stepping motor is shown in FIG. 4. Bidirectional stepping motors and their drive and direction switching circuits are well known in the art and do not form a part of this invention and will therefore not be described.

Figure 5:
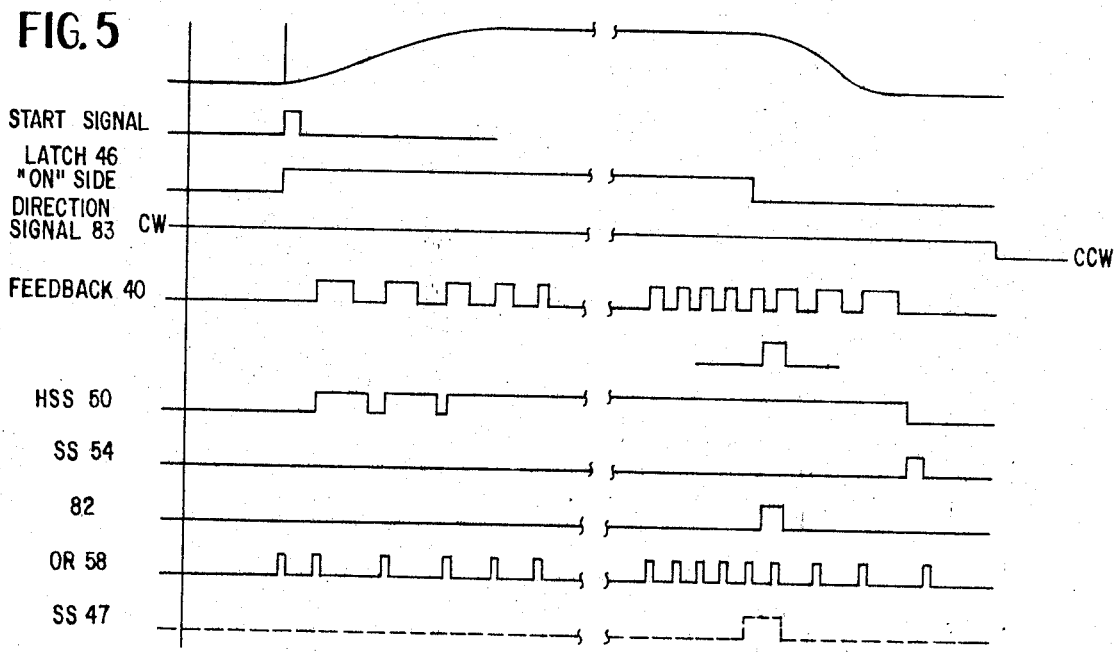
FIG. 5 is a timing diagram for the circuit of FIG. 4.

Operation of this embodiment of the invention will be described with reference to FIGS. 4 and 5. Initially a start pulse sets latch 46 so as to cause the "on" side of the latch to go positive with respect to the "off" side. As the "off" side goes negative, an output pulse is realized which is applied to AC-OR-gate 58. In response to this pulse, a positive drive pulse is produced at the output of AC-OR-gate 58 which is applied to the drive circuit of the motor, thereby advancing the motor one step in the direction determined by the clockwise-counterclockwise direction signal source 83 which is applied to the motor's direction circuitry.

Rotation of the rotor results in a feedback pulse at the feedback transducer 40. Such a feedback transducer has been described above. The feedback pulse produced by the feedback transducer is applied by way of amplifier 42 to the holdover single shot 50 which is thus fired. The pulse from the holdover single shot 50 is blocked from single shot 54 and NAND-gate 48 by NOR-gate 52. Gate 52 operates in such a manner that if one of the inputs is high, its output is low, while if two inputs are low, the output is high. Thus, the high signal from run latch 46 blocks gate 52. The low signal applied to NAND-gate 48 from gate 52 passes feedback pulses from amplifier 42 to the AC-OR-gate 58. These feedback pulses advance the motor windings a step at a time.

As explained previously, the starting sequence is such as to cause the rotor to lag the applied field to thereby develop a positive torque. Stopping is accomplished by applying a reversing signal to the motor direction switching windings 80 which has the effect of causing the rotor to lead the field.

The stopping sequence is initiated by resetting latch 46 by means of a stop pulse. The introduction of the stop pulse to latch 46 may be accomplished automatically after a predetermined number of steps by coupling a counter 59 and a single shot 47 between the output of AC-OR-gate 58 and the stop signal line of latch 46. The output from counter 59 triggers single shot 47 which applies a stop pulse to the latch 46. The use of counter 59 is optional.

The stop signal causes the "on" side of the latch to go negative while causing the "off" side to go positive. The positive signal from the "off" side of run latch 46 triggers single shot 60. The duration of the single shot 60 signal is such that it allows the trailing edge of the next feedback pulse to trigger single shot 64. This is accomplished by applying the feedback pulse, through inverter 66 to AND-gate 62. The signal from single shot 64 is fed to the logic circuitry designated generally as 82. The coincidence between the signal from single shot 64 and the directional signal results in a signal at E opposite from the existing direction signal for a length of time equal to the duration of the single shot 64 signal. The duration of this signal is so selected as to assure its existence during the next feedback pulse. In this manner, the next feedback pulse operates to advance the motor winding in a reverse direction. Since the directional signal at point E, after the passing of the single shot 64 signal, reverts to its original direction, feedback pulses fed through gate 48 to OR-gate 58 cause drive pulses to advance the motor winding in the original direction. The result of this procedure, as explained previously, causes the rotor to lead the field. Due to the fact that the field now lags the rotor, specifically the rotor being one step ahead of the field, a negative torque is developed which causes the motor to slow down.

The logic circuitry designated generally at 82 serves the same purpose in the bidirectional embodiment of the circuitry as does single shot 28 in the single direction embodiment shown in FIG. 2.

Figure 6:
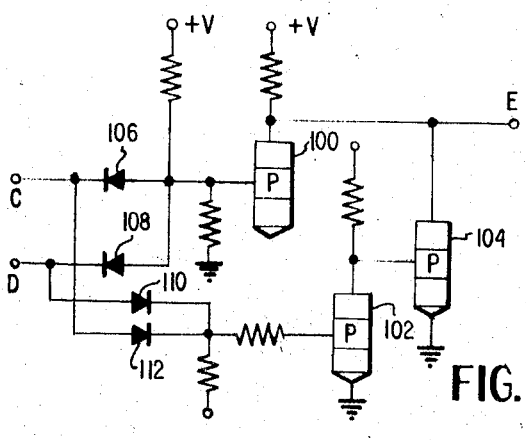
FIG. 6 shows circuitry which will effect the logic shown generally at 82 in FIG. 4.
Figure 7:
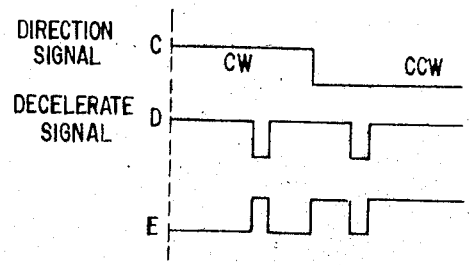
FIG. 7 is a timing diagram for the circuit of FIG. 6.

The logical functions contained within 82 are accomplished by the circuitry shown in FIG. 6. The operation of this circuit will be described in relation to the timing diagram shown in FIG. 7. Assuming initially, in the absence of a decelerate signal, that a clockwise direction signal is applied to terminal C of the circuit of FIG. 6, diodes 106, 108 and 110 will be nonconductive, while diode 112 will be conductive. This causes transistor 100 to conduct which causes the output at E to attain the low level shown in the timing diagram labeled "E" in FIG. 7. On the introduction of the decelerate signal to terminal D, diode 108 becomes conductive driving transistor 100 off. Since the direction signal still is in its clockwise direction, the high level signal applied to terminal C causes diode 112 to remain conductive. This has the effect of retaining transistor 102 in its "on" condition which in turn causes transistor 104 to be in its "off" state. The end result is that terminal E attains a positive value approximately equivalent to +V.

In the absence of a decelerate signal, a counterclockwise direction signal applied to the circuit causes diode 106 to conduct, thereby causing transistor 100 to switch "off." The high level of the signal applied to terminal D causes diode 110 to conduct turning on transistor 102 which in turn causes transistor 104 to switch to its "off" state. Since both transistors 100 and 104 are off when a counterclockwise direction signal is applied, terminal E attains a positive value approximately equal to +V.

When a decelerate signal is introduced to terminal D with terminal C at a low state, diode 108 becomes conductive causing no change in the off state of transistor 100. However, the introduction of the decelerate pulse causes diode 110 to be nonconductive. Since diode 112, under the control of the counterclockwise direction signal, is also nonconductive, transistor 102 is switched off thereby turning on transistor 104. In this manner, terminal E attains a low value approximately equal to ground potential. This is shown by the drop in potential in the timing diagram labeled "E."

As the rate of the feedback pulses decreases a point is reached where the holdover single shot 50 will go off before the succeeding feedback pulse. At this point, both inputs to gate 52 are low causing its output to go high. The signal from gate 52 triggers single shot 54 and blocks gate 48. Single shot 54 serves the same function as single shot 18 of FIG. 2. The signal from single shot 54 is applied to AC-OR-gate 58 which applies the last drive pulse to the motor drive circuit 80. As a result of this last drive pulse, the rotor is caused to align itself with the field thus placing the motor in its equilibrium state.

While the invention has been particularly shown and described with reference to the preferred embodiments thereof, it will be understood that various changes in form and detail may be made therein without departing from the spirit and scope of the invention.

What is claimed is:

1. In a system for controlling the movement of a stepping motor comprising drive pulse responsive means for driving the motor through a series of discrete steps, said drive pulse responsive means including a plurality of coils the selective energization thereof causing the motor rotor to rotate through a series of steps and switch means causing energization of said coils in a first or second sequence to control the direction of rotor rotation, the improvement comprising:
    a. means for generating a single train of feedback pulses from an operating stepping motor,
    b. gate means for selectively applying said feedback pulses as drive pulses to said drive pulse responsive means,
    c. counter means, for storing an indication of the number of drive pulses applied to said drive pulse responsive means,
    d. first pulse producing means, responsive to a predetermined count in said counter means, for simultaneously causing the generation of a drive pulse and a reversal of the coil energization sequence for a predetermined time interval to thereby cause the coil energization sequence to assume its prereversal state before the generation of the next succeeding drive pulse, and
    e. second pulse producing means, responsive to a predetermined number of drive pulses for generating a drive pulse at a predetermined time to bring said rotor to a substantially nonoscillating stop.

2. The system of claim 1 wherein said first pulse producing means includes means for disabling said gate means for a time sufficient to block succeeding feedback pulses from said drive pulse responsive means while simultaneously causing reversal of the coil energization sequence and means for generating a drive pulse independent of the feedback pulses concurrently with the coil energization sequence reversal.

3. The system of claim 2 further including delay means responsive to said predetermined number of drive pulses for causing the blocking of said gate means.

4. The system of claim 1 further including, latch means for indicating the operating state of said system, means for causing the latch means to switch to a state indicating deenergization of said motor in response to a predetermined count in said counter, said first pulse producing means including means responsive to the switching of said latch means for causing reversal of the coil energization sequence on the occurrence of the next succeeding feedback pulse to thereby simultaneously cause the generation of a drive pulse and a coil energization sequence reversal.

5. The system of claim 4 further including a motor direction signal source for controlling the coil energization sequence, said means for causing coil energization reversal concurrently with the next feedback pulse comprising;
    a. first single shot pulse generator responsive to the switching of the latch means,
    b. AND gate means, the inputs thereof receiving said feedback pulses and the output from said first single shot pulse generator,
    c. second single shot pulse generator coupled to the output of said AND gate means for generating an output pulse of a predetermined length in response to coincidence between a feedback pulse and an output from said first single shot and d. logic means, responsive to an output from said second single shot for reversing the coil energization sequence for the duration of the second single shot generated pulse.

6. The system of claim 5 wherein said logic means includes,
a. second AND gate means and OR gate means the inputs thereof receiving the outputs from said direction signal source and said second single shot,
b. inverter means coupled to the output of said OR gate means and AND gate means and inverter means, said terminal means being further connected to said switch means.

7. The system of claim 4 wherein said gate means for selectively applying feedback pulses as drive pulses comprises;
a. a coincidence gate,
b. a hold over single shot pulse generator and
c. a NOR gate, the inputs thereof coupled to said latch means and said hold over single shot, the output thereof being coupled to said coincidence gate.

* * * * *